United States Patent
Matsuda

(10) Patent No.: US 10,270,314 B2
(45) Date of Patent: Apr. 23, 2019

(54) COOLING FOR DRIVE MOTOR AND TRANSMISSION OF ELECTRIC VEHICLE

(71) Applicant: Kawasaki Jukogyo Kabushiki Kaisha, Kobe-shi, Hyogo (JP)

(72) Inventor: Yoshimoto Matsuda, Kobe (JP)

(73) Assignee: KAWASAKI JUKOGYO KABUSHIKI KAISHA, Kobe-shi, Hyogo (JP)

(*) Notice: Subject to any disclaimer, the term of this patent is extended or adjusted under 35 U.S.C. 154(b) by 336 days.

(21) Appl. No.: 15/025,867

(22) PCT Filed: Oct. 2, 2013

(86) PCT No.: PCT/JP2013/005873
§ 371 (c)(1),
(2) Date: Mar. 29, 2016

(87) PCT Pub. No.: WO2015/049711
PCT Pub. Date: Apr. 9, 2015

(65) Prior Publication Data
US 2016/0236748 A1    Aug. 18, 2016

(51) Int. Cl.
*H02K 9/19* (2006.01)
*H02K 9/00* (2006.01)
(Continued)

(52) U.S. Cl.
CPC ............... *H02K 9/19* (2013.01); *B60L 1/003* (2013.01); *B60L 3/003* (2013.01); *B60L 3/0061* (2013.01);
(Continued)

(58) Field of Classification Search
CPC .. H02K 9/00; H02K 9/04; H02K 9/12; H02K 9/16; H02K 9/18; H02K 9/19;
(Continued)

(56) References Cited

U.S. PATENT DOCUMENTS 6,772,504 B2 * 8/2004 Weidman ................. H02K 1/32
29/598
2004/0163409 A1 * 8/2004 Nakajima ............... F16H 57/04
62/505

(Continued)

FOREIGN PATENT DOCUMENTS

JP    2005117790 A  *  4/2005
JP    2008228401 A  *  9/2008

(Continued)

OTHER PUBLICATIONS

Ikeda Koichi, In-wheel Motor, Toyota Motor Corp, Sep. 25, 2008, JP 2008228401 (English Machine Translation).*

(Continued)

*Primary Examiner* — Bernard Rojas
*Assistant Examiner* — Alexander A Singh
(74) *Attorney, Agent, or Firm* — Alleman Hall Creasman & Tuttle LLP

(57) ABSTRACT

An electric vehicle comprises a driving motor which generates heat during an operation of the driving motor; a driving power transmission mechanism which transmits driving power of the driving motor to a rear wheel (drive wheel); an oil pan (first reservoir section) which is placed below the driving motor and reserves oil (coolant) therein; an oil reservoir (second reservoir section) which is placed above the driving motor and reserves the oil (coolant) therein; a fluid passage which causes the oil pan and the oil reservoir to be in communication with each other; and a pump which supplies the oil (coolant) from the oil pan to the oil reservoir through the fluid passage, and the oil reservoir includes a first drop hole through which the oil (coolant) is dropped toward the driving motor by a gravitational force.

10 Claims, 6 Drawing Sheets

(51) Int. Cl.
  *B62M 7/02*     (2006.01)
  *B62K 11/04*    (2006.01)
  *B62J 31/00*    (2006.01)
  *H02K 7/108*    (2006.01)
  *B60L 1/00*     (2006.01)
  *B60L 3/00*     (2019.01)
  *H02K 7/116*    (2006.01)
  *B60L 50/16*    (2019.01)
  *B60L 50/51*    (2019.01)
  *B60L 58/21*    (2019.01)
  *B60L 50/60*    (2019.01)
  *B62M 11/06*    (2006.01)
  *H02K 5/173*    (2006.01)

(52) U.S. Cl.
  CPC .............. *B60L 50/16* (2019.02); *B60L 50/51* (2019.02); *B60L 50/66* (2019.02); *B60L 58/21* (2019.02); *B62J 31/00* (2013.01); *B62K 11/04* (2013.01); *B62M 7/02* (2013.01); *H02K 7/108* (2013.01); *H02K 7/116* (2013.01); *H02K 9/00* (2013.01); *B60L 2200/12* (2013.01); *B60L 2200/36* (2013.01); *B60L 2210/40* (2013.01); *B60L 2240/36* (2013.01); *B62K 2204/00* (2013.01); *B62K 2208/00* (2013.01); *B62M 11/06* (2013.01); *B62M 2701/0007* (2013.01); *B62M 2701/0092* (2013.01); *H02K 5/1732* (2013.01); *Y02T 10/641* (2013.01); *Y02T 10/70* (2013.01); *Y02T 10/7005* (2013.01); *Y02T 10/7061* (2013.01); *Y02T 10/7077* (2013.01); *Y02T 10/7241* (2013.01); *Y02T 90/16* (2013.01)

(58) Field of Classification Search
  CPC .......... H02K 9/193; H02K 9/197; H02K 9/22; H02K 9/28; H02K 7/108; H02K 7/116; H02K 5/1732; B62M 6/00; B62M 6/90; B62M 11/06; B62M 2701/0092; B62M 7/02; B62M 2701/007; B60L 1/003; B60L 3/003; B60L 3/0061; B60L 11/14; B60L 11/1803; B60L 11/1864; B60L 11/1877; B60L 2200/12; B60L 2200/36; B60L 2210/40; B60L 2240/36; B62K 11/04; B62K 2204/00; B62K 2208/00; B62J 31/00; Y02T 10/7005; Y02T 10/7077; Y02T 10/7241; Y02T 10/7061; Y02T 10/70; Y02T 10/641; Y02T 90/16
  USPC .......... 310/52, 54, 57, 58, 59, 60 R, 62, 63, 310/60 A, 64
  See application file for complete search history.

(56) References Cited

U.S. PATENT DOCUMENTS

2011/0298314 A1* 12/2011 Atarashi ................ B60K 6/405
                                                    310/54
2012/0235521 A1*  9/2012 Cai ......................... H02K 9/19
                                                    310/54
2013/0270038 A1* 10/2013 Nitta ..................... B62K 11/04
                                                    184/6

FOREIGN PATENT DOCUMENTS

| JP | 2012106599 A | 6/2012 |
| JP | 2013034289 A | 2/2013 |
| JP | 2013179811 A | 9/2013 |
| WO | 2012090463 A1 | 7/2012 |

OTHER PUBLICATIONS

Kitagawa Katsuhide, Driver and Automobile Carrying the Same, Apr. 28, 2005, Toyota Motor Corp, JP 2005117790 (English Machine Translation).*
International Bureau of WIPO, International Preliminary Report on Patentability Issued in Application No. PCT/JP2013/005873, dated Apr. 5, 2016, WIPO, 8 pages.
ISA Japanese Patent Office, International Search Report Issued in Application No. PCT/JP2013/005873, dated Dec. 24, 2013, WIPO, 3 pages.

* cited by examiner

COOLING FOR DRIVE MOTOR AND TRANSMISSION OF ELECTRIC VEHICLE

TECHNICAL FIELD

The present invention relates to an electric vehicle including a driving motor which generates heat during operation of the driving motor.

BACKGROUND ART

An electric vehicle disclosed in Patent Literature 1 is configured to lubricate a driving power transmission mechanism and cool a driving motor, using common oil.

CITATION LIST

Patent Literature

Patent Literature 1: WO 2012/090463 A1

SUMMARY OF INVENTION

Technical Problem

Regarding the electric vehicle disclosed in Patent Literature 1, it is expected that the driving motor is cooled more effectively.

The present invention has been developed to solve the above-described problem, and an object of the present invention is to provide an electric vehicle which can cool the driving motor more effectively.

Solution to Problem

To achieve the above-described object, an electric vehicle of the present invention comprises: a driving motor which generates heat during an operation of the driving motor; a driving power transmission mechanism which transmits driving power of the driving motor to a drive wheel; a first reservoir section which is placed below the driving motor and reserves a coolant therein; a second reservoir section which is placed above the driving motor and reserves the coolant therein; a fluid passage which causes the first reservoir section and the second reservoir section to be in communication with each other; and a pump which supplies the coolant from the first reservoir section to the second reservoir section through the fluid passage, wherein the second reservoir section includes a first drop hole through which the coolant is dropped toward the driving motor by a gravitational force.

When the pump is driven, the coolant is supplied from the first reservoir section to the second reservoir section through the fluid passage. The coolant reserved in the second reservoir is dropped toward the driving motor through the first drop hole, cools the driving motor, and then is gathered in the first reservoir section. When the pump is stopped, the supply of the coolant to the second reservoir section is stopped. However, the coolant is reserved in the second reservoir section. Therefore, the driving motor can continue to be cooled using this coolant. In this way, the driving motor can be cooled effectively.

Advantageous Effects of Invention

In accordance with the present invention, the driving motor can be cooled effectively, with the above-described configuration.

DESCRIPTION OF EMBODIMENTS

Hereinafter, the preferred embodiment of an electric vehicle according to the present invention will be described with reference to the accompanying drawings. The directions stated below are from the perspective of a rider straddling the electric vehicle, and a rightward and leftward direction conforms to a vehicle width direction of a vehicle body.

Figure 1:
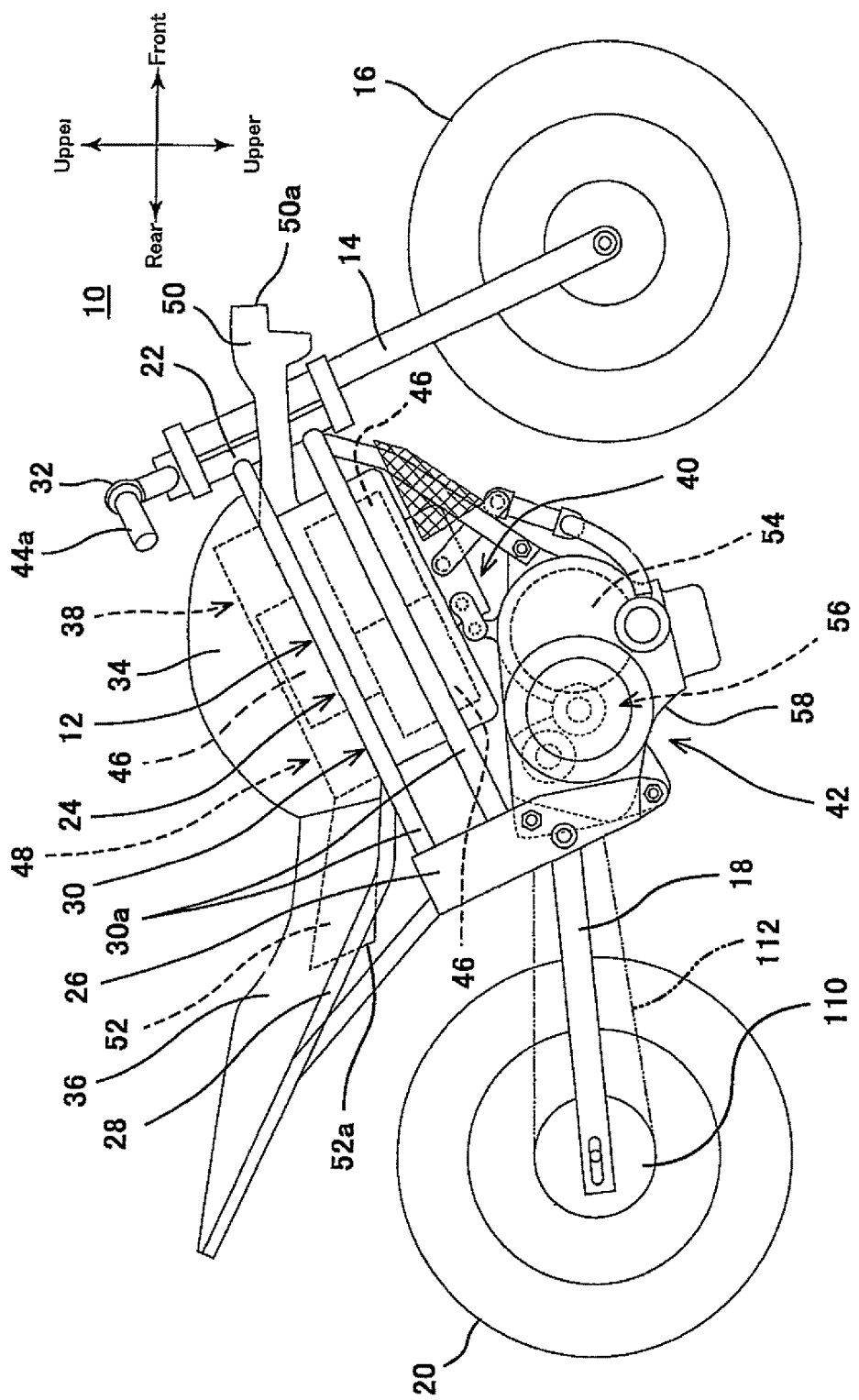
FIG. 1 is a right side view of an electric vehicle according to the embodiment.

FIG. 1 is a right side view of an electric vehicle 10 according to the embodiment of the present invention. In the present embodiment, the electric vehicle 10 is an electric motorcycle, and receives ram air blowing from the front during travel of the electric vehicle 10. As shown in FIG. 1, the electric vehicle 10 includes a vehicle body frame 12, a front fork 14 provided at the front portion of the vehicle body frame 12, a front wheel 16 mounted to the front fork 14, a swing arm 18 which is mounted to the rear portion of the vehicle body frame 12 in such a manner that the swing arm 18 is vertically pivotable, and a rear wheel 20 mounted to the swing arm 18.

As shown in FIG. 1, the vehicle body frame 12 includes a head pipe 22, a main frame 24 extending rearward from the head pipe 22 in such manner that the main frame 24 is inclined downward, a pivot frame 26 which is connected to the rear end of the main frame 24 and supports the swing arm 18, and a rear frame 28 extending rearward from the rear portion of the main frame 24 and the upper portion of the pivot frame 26. The main frame 24 includes a pair of right and left frame members 30 extending rearward from the head pipe 22. Each of the frame members 30 includes two pipe members 30a which are vertically spaced apart from each other.

Further, as shown in FIG. 1, the electric vehicle 10 includes a steering handle 32, a dummy tank 34 mounted to the main frame 24 in a location that is rearward relative to the steering handle 32, a seat 36 mounted to the rear frame 28 in a location that is rearward relative to the dummy tank 34, a battery unit 38 mounted to the main frame 24 in a location that is below the dummy tank 34, an inverter unit 40 placed below the battery unit 38, and a motor unit 42 placed below the inverter unit 40. An electric control unit (ECU) which is not shown controls devices including an inverter based on signals received from sensors. The steering handle 32 is provided with a pair of right and left grips 44a. The rider straddles the seat 36 and grips the grips 44a. In this state, the rider steers the steering handle 32.

As shown in FIG. 1, the battery unit 38 includes a plurality of batteries 46, a battery box 48 which accommodates therein the plurality of batteries 46, an air guide duct 50 which guides ram air to the battery box 48, and an air discharge duct 52 which discharges the ram air guided to the battery box 48, to a rear side. A front end opening 50a of the air guide duct 50 is opened to the front, in front of the head pipe 22. A rear end opening 52a of the air discharge duct 52 is opened to the rear, in a location that is below the seat 36. During travel of the electric vehicle 10, the ram air is taken into the air guide duct 50 through the front end opening 50a, and supplied to the battery box 48 through the air guide duct 50. This ram air takes heat out of the plurality of batteries 46, then flows rearward through the air discharge duct 52, and is discharged through the rear end opening 52a.

Figure 2:
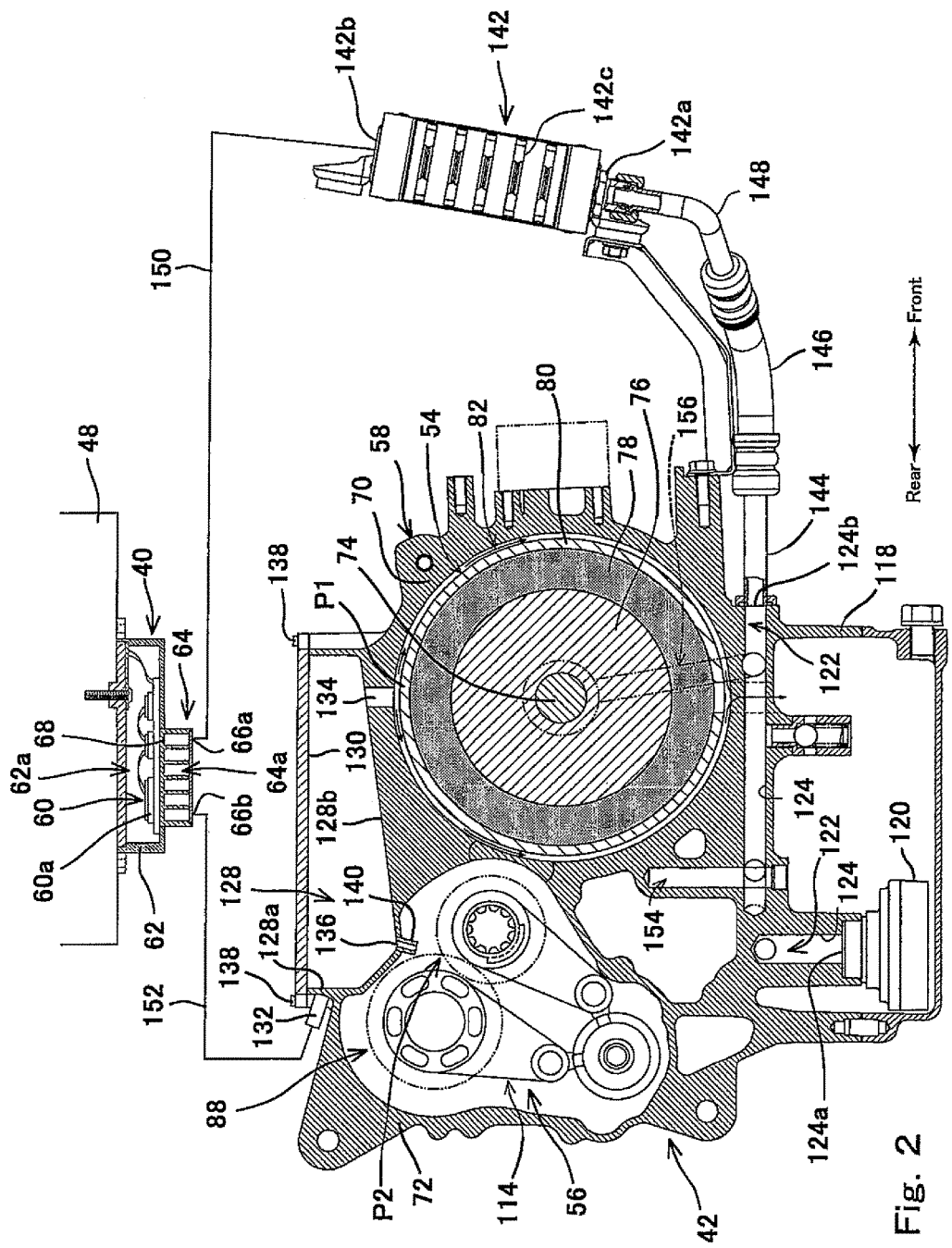
FIG. 2 is a cross-sectional view showing a motor unit and an inverter unit, which is taken along a vertical plane extending in a forward and rearward direction, when viewed from the right.

As shown in FIG. 1, the motor unit 42 includes a driving motor 54 which generates heat during its operation, a driving power transmission mechanism 56 which transmits driving power generated in the driving motor 54 to the rear wheel 20 which is a drive wheel, and a case 58 which accommodates therein the driving motor 54 and the driving power transmission mechanism 56. The driving motor 54 performs a motor operation to generate the driving power using electric power supplied from the plurality of batteries 46 to the driving motor 54 via an inverter 60 (FIG. 2). Also, the driving motor 54 performs a power generation operation in such a manner that the driving motor 54 generates an AC current during regenerative braking of the electric vehicle 10. The inverter 60 (FIG. 2) of the inverter unit 40 converts the AC current generated in the power generation operation into a DC current, which is stored in the plurality of batteries 46.

FIG. 2 is a cross-sectional view showing the motor unit 42 and the inverter unit 40, which is taken along a vertical plane extending in the forward and rearward direction, when viewed from the right. The inverter unit 40 is configured to switch the operation mode of the driving motor 54 between the motor operation and the power generation operation. As shown in FIG. 2, the inverter unit 40 includes the inverter 60 in which a power semiconductor 60a such as an insulated-gate bipolar transistor (IGBT) is mounted, an inverter case 62 which accommodates the inverter 60 therein, and a cooler 64 attached to the inverter case 62. The cooler 64 is formed with a fluid passage 64a having a labyrinth structure through which the coolant flows. The fluid passage 64a is isolated from an accommodating space 62a accommodating the inverter 60 by a separating wall 68. The fluid passage 64a is sealingly closed except for an inlet 66a and an outlet 66b. The inverter unit 40 is attached to the lower surface of the battery box 48. The inverter 60 is electrically connected to the plurality of batteries 46 (FIG. 1) and to the driving motor 54 via conductive wires which are not shown.

Figure 3:
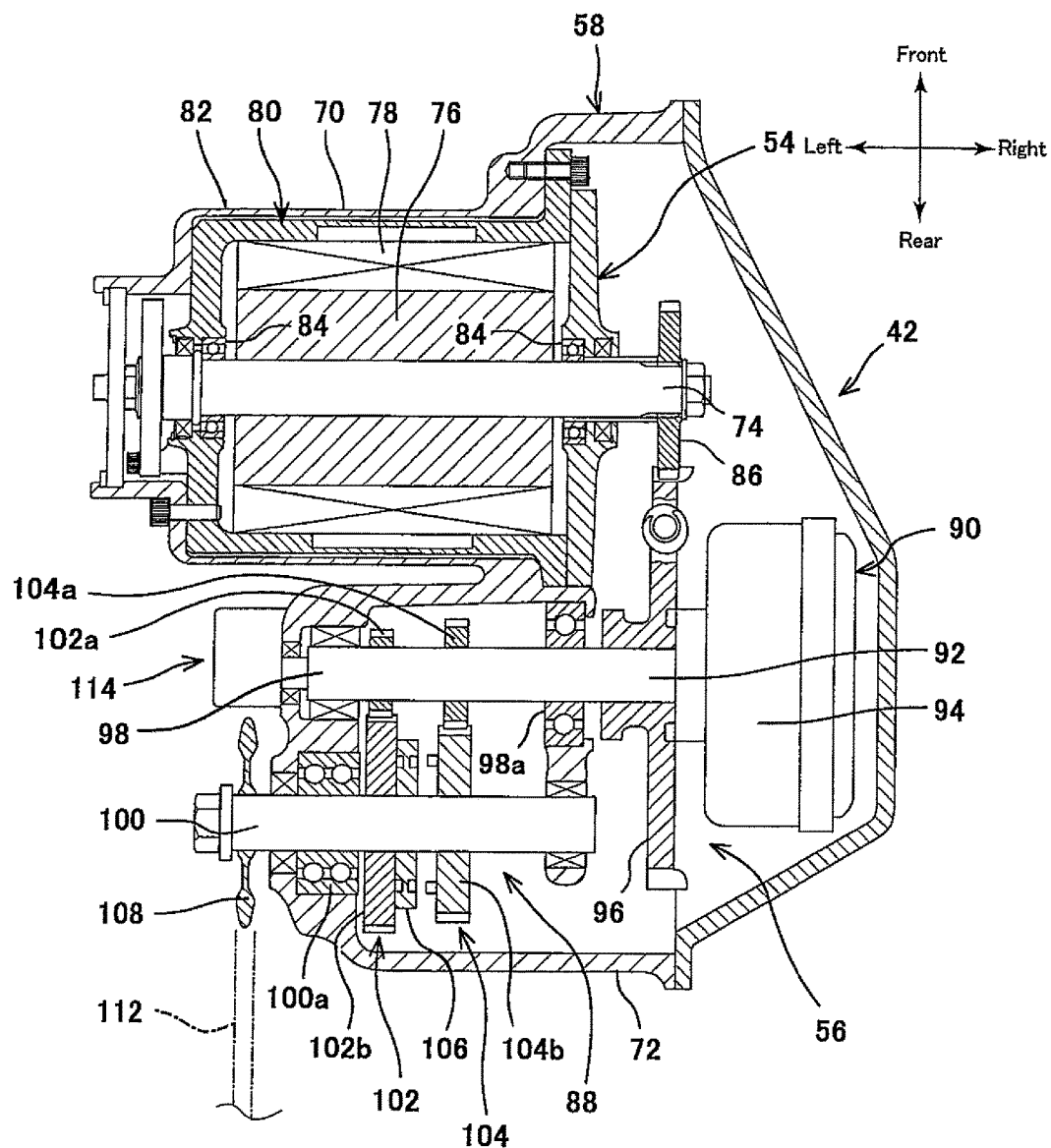
FIG. 3 is a cross-sectional view showing the cross-section of the motor unit, which is taken along a horizontal plane, when viewed from above.

FIG. 3 is a cross-sectional view showing the cross-section of the motor unit 42, which is taken along a horizontal plane, when viewed from above. As shown in FIGS. 2 and 3, the case 58 of the motor unit 42 includes a motor accommodating section 70 and a transmission accommodating section 72 which are continuous in the forward and rearward direction. The motor accommodating section 70 has a bottomed cylinder shape having an axis extending in a rightward and leftward direction. The driving motor 54 is accommodated in the motor accommodating section 70. The driving motor 54 includes a motor shaft 74, a rotor 76 attached to the motor shaft 74, a ring-shaped stator 78 provided to surround the rotor 76, and a motor case 80 of a bottomed cylinder shape, which accommodates therein the motor shaft 74, the rotor 76, and the stator 78. A cooling jacket 82 is provided in a space formed between the outer peripheral surface of the motor case 80 and the inner peripheral surface of the motor accommodating section 70. Oil is supplied to the cooling jacket 82 as the "coolant." As shown in FIG. 3, the right and left end portions of the motor shaft 74 are supported by motor bearings 84, respectively. In the present embodiment, the motor bearings 84 are ball bearings. An output gear 86 is mounted on a first end portion (right end portion in the present embodiment) of the motor shaft 74 and outputs the driving power of the driving motor 54.

As shown in FIG. 3, a transmission 88 of a multi-stage type is placed rearward relative to the driving motor 54. A clutch mechanism 90 is placed between the driving motor 54 and the transmission 88. The clutch mechanism 90 includes a clutch shaft 92, a clutch member 94 mounted to a first end portion (right end portion in the present embodiment) of the clutch shaft 92, and a clutch gear 96 which is rotatably placed to surround the clutch shaft 92. The clutch gear 96 is in mesh with the output gear 86 of the driving motor 54, and is rotatable together with the output gear 86. The clutch member 94 is configured to perform switching between a state in which the rotational power of the clutch gear 96 is transmitted to the clutch shaft 92, and a cut-off state in which the rotational power of the clutch gear 96 is cut off and is not transmitted to the clutch shaft 92.

As shown in FIG. 3, the transmission 88 includes an input shaft 98, a bearing 98a which supports the input shaft 98 in such a manner that the input shaft 98 is rotatable, an output shaft 100 placed in parallel with the input shaft 98, and a bearing 100a which supports the output shaft 100 in such a manner that the output shaft 100 is rotatable. In the present embodiment, a common member is used as the input shaft 98 and the clutch shaft 92 of the clutch mechanism 90. Alternatively, the input shaft 98 and the clutch shaft 92 may be separate members. A plurality of input gears 102a, 104a are mounted on the input shaft 98. A plurality of output gears 102b, 104b are mounted on the output shaft 100. The plurality of input gears 102a, 104a mesh with the plurality of output gears 102b, 104b, respectively, in a one-to-one correspondence, to form a plurality of (two in the present embodiment) gear pairs 102, 104, which are different in gear ratio. A dog clutch 106 is attached to the input shaft 98. In a state in which the output gear 102b is connected to the output shaft 100 via the dog clutch 106, the rotational power is transmitted to the output shaft 100 at a transmission gear position using the gear pair 102. In contrast, in a state in which the output gear 104b is connected to the output shaft 100 via the dog clutch 106, the rotational power is transmitted to the output shaft 100 at a transmission gear position using the gear pair 104. Instead of the transmission 88 of the multi-stage type, a gearless transmission of a belt type may be used, or a reduction gear mechanism with a constant transmission gear ratio may be used. A first sprocket 108 is attached to a first end portion (left end portion in the present embodiment) of the output shaft 100. A chain 112 is wrapped around the first sprocket 108 and a second sprocket 110 (FIG. 1) of the rear wheel 20.

Figure 4:
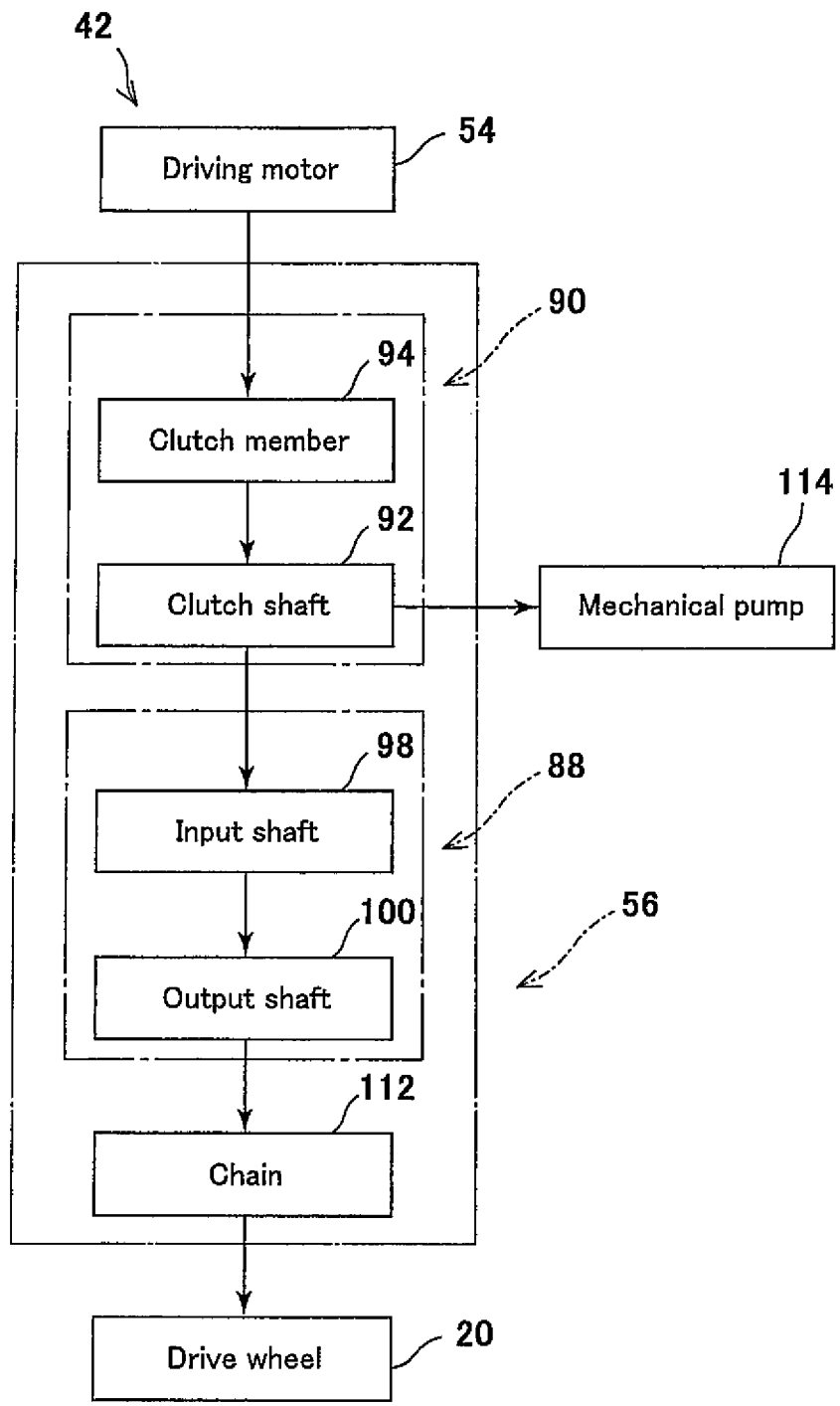
FIG. 4 is a block diagram showing a driving power transmission path of a driving motor.

FIG. 4 is a block diagram showing the driving power transmission path of the driving motor 54. As shown in FIG. 4, in the motor unit 42, the driving power of the driving motor 54 is transmitted to the rear wheel 20 (drive wheel) through the clutch member 94 of the clutch mechanism 90, the clutch shaft 92 of the clutch mechanism 90, the input shaft 98 of the transmission 88, the output shaft 100 of the transmission 88, and the chain 112. The driving power transmission mechanism 56 includes the components from the clutch mechanism 90 to the chain 112. A mechanical pump 114 which is driven by the driving power transmitted from the clutch shaft 92 is connected to the clutch shaft 92. In the present embodiment, the mechanical pump 114 includes an impeller (not shown). The impeller is rotated by the rotational power transmitted from the clutch shaft 92. In the present embodiment, the clutch shaft 92 and the mechanical pump 114 are located downstream of the clutch member 94 on the driving power transmission path. Therefore, in the cut-off state in which the clutch member 94 cuts off the rotational power transmitted to the clutch shaft 92, the clutch shaft 92 and the mechanical pump 114 can be driven by the rotational power transmitted from the rear wheel 20 (drive wheel).

It is sufficient that the mechanical pump 114 is mechanically driven by the driving motor 54 or the driving power transmission mechanism 56. A member to which the mechanical pump 114 is connected is not limited to the clutch shaft 92. For example, the mechanical pump 114 may be connected to the motor shaft 74 or the output shaft 100. In a case where the input shaft 98 and the clutch shaft 92 are provided as separate members, the mechanical pump 114 may be connected to the input shaft 98. Further, the mechanical pump 114 may be connected to one of the output gear 86, the clutch gear 96, the input gear 102a, 104a, and the output gear 102b, 104b, which are shown in FIG. 3, via an intermediate gear (not shown), etc. As shown in FIG. 1, an electric pump 116 is attached to the right side surface of the motor unit 42.

As shown in FIG. 2, an oil pan 118 is provided at the lower portion of the case 58 of the motor unit 42 as a first reservoir section, to reserve therein the oil flowing downward from the motor accommodating section 70 and the transmission accommodating section 72. The oil pan 118 is placed below the driving motor 54. In the interior of the oil pan 118, a strainer 120 is placed to remove foreign matters from the oil. The case 58 is formed with a hole 124 constituting the fluid passage 122 through which the oil is circulated. The strainer 120 is connected to an inlet 124a of the hole 124 constituting the upstream end portion of the fluid passage 122. An oil reservoir 126 which reserves the oil therein is provided at the upper portion of the case 58 as a "second reservoir section." The oil reservoir 126 is placed above the driving motor 54. The oil pan 118 and the oil reservoir 126 are in communication with each other via the fluid passage 122.

As shown in FIG. 2, the oil reservoir 126 includes a recess 128 formed at the upper portion of the case 58, and a lid member 130 which closes the upper opening of the recess 128. The recess 128 is provided between the driving motor 54 and the driving power transmission mechanism 56 to connect a region above the driving motor 54 to a region above the driving power transmission mechanism 56. In the present embodiment, the driving motor 54 and the driving power transmission mechanism 56 are arranged side by side in a horizontal direction. This makes it possible to easily form the recess 128 between the region above the driving motor 54 and the region above the driving power transmission mechanism 56. A side wall 128a of the recess 128 is provided with a tubular inlet 132. A bottom portion 128b of the recess 128 is provided with at least one first drop hole 134 through which the oil is dropped as the "coolant" toward the driving motor 54 by a gravitational force, and at least one second drop hole 136 through which the oil is dropped as a "lubricating liquid" toward the driving power transmission mechanism 56 by the gravitational force. The lid member 130 is attached sealingly to the upper end surface of the recess 128 by use of fastener members 138, such as bolts.

When the amount of the oil discharged through the first drop hole 134 and the second drop hole 136 per unit time for a period that passes until the oil reservoir 126 is filled with the oil is a discharge amount Q, and the amount of the oil supplied to the oil reservoir 126 through the inlet 132 per unit time for the period that passes until the oil reservoir 126 is filled with the oil is a supply amount R, the number, diameter, shape, and the like of the first drop hole 134 and the second drop hole 136 are set so that the discharge amount Q is less than the supply amount R. Therefore, by continuing to supply the oil to the oil reservoir 126 through the inlet 132, the oil reservoir 126 is filled with the oil. The inner space of the recess 128, except the inlet 132, the first drop hole 134 and the second drop hole 136, is sealingly closed. Therefore, after the oil reservoir 126 has been filled with the oil, the oil reserved in the oil reservoir 126 is pressurized by the discharge pressure of the mechanical pump 114 or the electric pump 116.

As shown in FIG. 2, in the present embodiment, a plurality of first drop holes 134 are arranged to be spaced apart from each other in the rightward and leftward direction in such a manner that the first drop holes 134 face the top portion P1 of the driving motor 54 in a vertical direction. The lower end of each of the first drop holes 134 is in communication with the annular space of the cooling jacket 82. Therefore, the oil dropped through each of the first drop holes 134 is divided at the top portion P1 of the driving motor 54 to flow to the front and to the rear, and flows downward along the surface of the driving motor 54. Alternatively, each of the first drop holes 134 may be formed with a throttle portion to reduce a fluid passage cross-sectional area. In this case, by pressurizing the oil reserved in the oil reservoir 126, the oil can be ejected through the first drop holes 134.

As shown in FIG. 2, in the present embodiment, a plurality of second drop holes 136 are arranged to be spaced apart from each other in the rightward and leftward direction in such a manner that the second drop holes 136 face teeth P2 which are in mesh, of the gears of the gear pair 102, 104 (FIG. 3). Each of the plurality of second drop holes 136 is formed by a tubular nozzle 140 in such a manner that the bore diameter of the second drop hole 136 is smaller than that of the first drop hole 134. The axis of the nozzle 140 is inclined slightly rearward with respect to the vertical direction. Therefore, when the oil reserved in the oil reservoir 126 is pressurized by the discharge pressure of the mechanical pump 114 or the electric pump 116, the oil is ejected through the second drop holes 136 toward the teeth P2 which are in mesh. Instead of the nozzle 140, each of the second drop holes 136 may be formed with a throttle portion to reduce its fluid passage cross-sectional area, or the nozzle 140 may be formed with the throttle portion. Further, each of the plurality of second drop holes 136 may face at least one of the motor bearing 84, the output gear 86, and the clutch gear 96.

As shown in FIG. 2, the bottom portion 128b of the recess 128 is inclined to be lower in a direction from the driving motor 54 toward the driving power transmission mechanism 56, and the upper end of each of the plurality of second drop holes 136 is set to be lower than the upper end of each of the first drop holes 134. When the oil is dropped through the first drop holes 134 and the second drop holes 136, the level of the oil reserved in the oil reservoir 126 is gradually lowered. When the level of the oil becomes lower than the upper end of each of the first drop holes 134, the oil is dropped only through the second drop holes 136 thereafter. This makes it possible to prevent a situation in which the amount of the oil supplied to the driving power transmission mechanism 56 through the second drop holes 136 becomes much less than the amount of the oil supplied to the driving motor 54 through the first drop holes 134, even though the bore diameter of the second drop holes 136 is smaller than that of the first drop holes 134.

As shown in FIG. 2, an oil cooler 142 is placed in front of the motor unit 42 to cool the oil by use of the ram air. The front surface of the case 58 is provided with an outlet 124b of the hole 124 constituting the fluid passage 122. The outlet 124b and an inlet 142a of the oil cooler 142 are connected to each other via a first pipe member 144, a first hose 146, and a second pipe member 148. An outlet 142b of the oil cooler 142 and an inlet 66a of the fluid passage 64a provided in the inverter unit 40 are connected to each other via a second hose 150. An outlet 66b of the fluid passage 64a provided in the inverter unit 40 and the inlet 132 of the oil reservoir 126 are connected to each other via a third hose 152. The first drop holes 134 of the oil reservoir 126 and the oil pan 118 are in communication with each other through the annular space of the cooling jacket 82. The second drop holes 136 of the oil reservoir 126 and the oil pan 118 are in communication with each other via the inner space of the transmission accommodating section 72. In the above-described manner, a portion of the fluid passage 122 aside from the hole 124 of the case 58 is formed.

Figure 5:
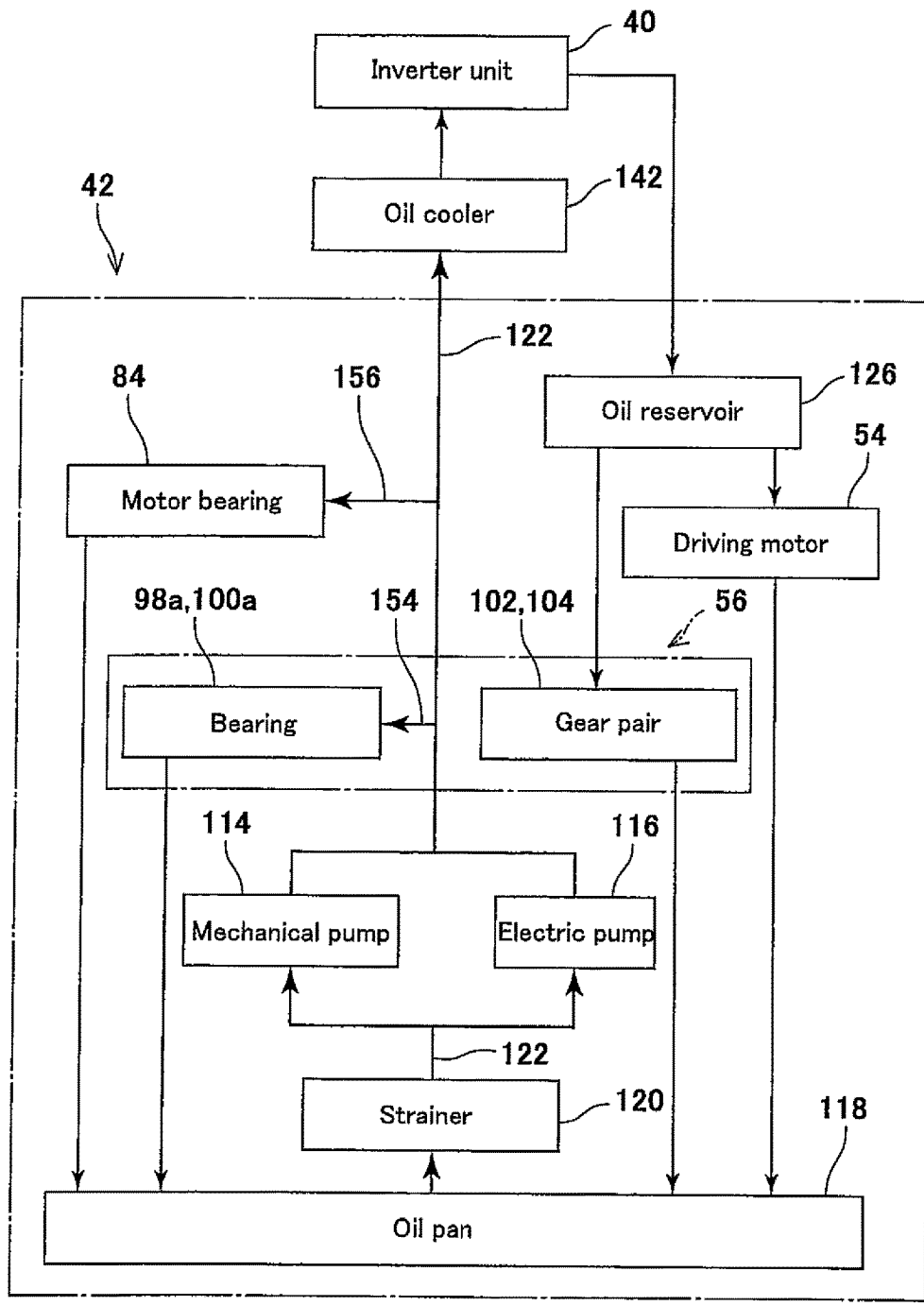
FIG. 5 is a block diagram showing an oil supply passage.

FIG. 5 is a block diagram showing the configuration of the oil supply passage. As shown in FIG. 5, the fluid passage 122 of the motor unit 42 is provided with the mechanical pump 114 and the electric pump 116. The oil reserved in the oil pan 118 is pumped by one or both of the mechanical pump 114 and the electric pump 116, and is discharged to the fluid passage 122. As shown in FIG. 4, the mechanical pump 114 is mechanically driven by the rotational power from the driving motor 54 or the rear wheel 20 (drive wheel), and discharges the oil in an amount which is proportional to the rotational speed of the driving motor 54 or the rear wheel 20 (drive wheel) to the fluid passage 122. The electric pump 116 contains a motor which is not shown, and the rotational speed of the motor is controlled by an electric pump control section which is not shown.

As shown in FIG. 5, the oil reserved in the oil pan 118 is pumped by the mechanical pump 114 and the electric pump 116, and is discharged to the fluid passage 122. A part of the oil discharged from the mechanical pump 114 and the electric pump 116 is supplied to the oil cooler 142 and is cooled by the ram air flowing along the outer surface of a core 142c (FIG. 2) of the oil cooler 142, while flowing upward through the interior of the core 142c. The oil which has been cooled by the oil cooler 142 is supplied to the inverter unit 40, and takes heat out of the inverter 60 (FIG. 2) while flowing through the fluid passage 64a (FIG. 2) of the cooler 64.

As shown in FIG. 5, after the oil has flowed through the inverter unit 40, the oil is supplied to the oil reservoir 126 and is temporarily reserved in the oil reservoir 126. Also, the oil is discharged through the first drop holes 134 and the second drop holes 136 (FIG. 2). The oil discharged through the first drop holes 134 is supplied to the top portion P1 (FIG. 2) of the driving motor 54, as the "coolant", and takes the heat out of the driving motor 54 while flowing downward along the outer peripheral surface of the driving motor 54. The oil discharged through the second drop holes 136 is supplied to the teeth P2 (FIG. 2) which are in mesh, of the gears of the gear pair 102, 104, as the "lubricating liquid", and lubricates the gear pair 102, 104 while flowing downward along the surface of the gear pair 102, 104. After the oil has flowed downward along the surface of the driving motor 54 and the oil has flowed downward along the gear pair 102, 104, the oil is gathered in the oil pan 118.

As shown in FIG. 5, a part of the oil which has been discharged from the mechanical pump 114 and the electric pump 116 to the fluid passage 122 is supplied to the driving power transmission mechanism 56 through a transmission fluid passage 154 (FIG. 2) as the "lubricating liquid", and lubricates the bearings 98a, 100a (FIG. 3) while flowing downward along the surfaces of the bearings 98a, 100a. Also, a part of the oil which has been discharged from the mechanical pump 114 and the electric pump 116 to the fluid passage 122 is supplied to the right and left motor bearings 84 (FIG. 3) of the driving motor 54 through a motor fluid passage 156 (FIG. 2), as the "lubricating liquid", and lubricates the motor bearings 84 while flowing downward along the surfaces of the motor bearings 84. After the oil has flowed downward along the bearings 98a, 100a (FIG. 3) and the oil has flowed downward along the motor bearings 84, the oil is gathered in the oil pan 118.

In a state in which a main switch of the electric vehicle 10 is OFF, the mechanical pump 114 and the electric pump 116 are not driven. For this reason, the components to be lubricated, of the driving power transmission mechanism 56 and the driving motor 54, have a shortage of the oil as the "lubricating liquid." When the main switch is turned ON, the electric pump 116 is driven, and thereby the oil is supplied to the components to be lubricated as the "lubricating liquid." The oil in a high-pressure state, which has been discharged from the electric pump 116, can be supplied immediately to the bearings 98a, 100a and the motor bearings 84. Therefore, the bearings 98a, 100a and the motor bearings 84 can be lubricated quickly. During travel of the electric vehicle 10, the mechanical pump 114 is driven by the driving power of the driving motor 54. In a case where the driving motor 54 is stopped or the clutch member 94 is disengaged (placed in the cut-off state), the mechanical pump 114 is driven by the rotational power of the rear wheel 20 (drive wheel). Therefore, during travel of the electric vehicle 10, driving time of the electric pump 116 can be reduced, and hence, electric consumption in the electric motor 116 can be reduced. When the temperatures of heat generating components such as the inverter unit 40 and the driving motor 54 are raised, or a condition in which the temperatures of the heat generating components are raised is satisfied (e.g., torque of the driving motor 54 exceeds a predetermined value), while the electric vehicle 10 is travelling, the electric pump 116 is driven, and the oil is supplied to the heat generating components as the "coolant". In this way, the heat generating components can be cooled effectively, and thermal destruction of the heat generating components can be suppressed.

When one of the mechanical pump 114 and the electric pump 116 is driven, the oil is supplied to the oil reservoir 126 through the fluid passage 122. As described above, the discharge amount Q of the oil reservoir 126 is less than the supply amount R of the oil reservoir 126. Therefore, when the oil supply to the oil reservoir 126 is continued, the oil reservoir 126 is filled with the oil. Thereafter, when the oil supply to the oil reservoir 126 is further continued, the discharge pressure of the mechanical pump 114 or the electric pump 116 is applied to the oil filled in the oil reservoir 126, and the oil is ejected through the first drop holes 134 and the second drop holes 136 of FIG. 2. In the second drop holes 136 having a smaller bore diameter, the flow velocity of the oil is increased. Therefore, even though the axes of the nozzles 140 are inclined with respect to the vertical line, the oil can be ejected in the axial direction of the nozzles 140 and can be efficiently supplied to the teeth P2 which are in mesh. In a case where the first drop holes 134 and the second drop holes 136 are formed with the throttle portions, the oil can be ejected and can be efficiently supplied. When the mechanical pump 114 and the electric pump 116 are stopped, the oil supply to the oil reservoir 126 is stopped. In this state, however, the oil is reserved in the oil reservoir 126. Therefore, the driving motor can be cooled, and the gear pair 102, 104 can be lubricated, until the oil reserved in the oil reservoir 126 has run out. The cooler 64 of the inverter unit 40 is placed above the oil reservoir 126. The layout of the pipe (third hose 152) is designed so that the coolant flows from the cooler 64 to the oil reservoir 126, by its own weight, even when the mechanical pump 114 and the electric pump 116 are stopped.

The oil reservoir 126 includes the lid member 130 which closes the upper opening of the recess 128 of the case 58. This can prevent a leakage of the coolant filled in the recess 128 to outside of the oil reservoir 126. Since the inlets of the second drop holes 136 are located to be lower than the inlets of the first drop holes 134, the oil can be dropped to the components to be lubricated for a time longer than that for which the oil is supplied to the heat generating components. Since the coolant which has taken the heat out of the inverter 60 is guided to the oil reservoir 126, the viscosity of the coolant is made lower than in a case where the coolant which has been cooled in the oil cooler 142 is directly guided to the oil reservoir 126, which can facilitate the passage of the liquid through the drop holes 134, 136. Since the bore diameter of the first drop holes 134 is greater than that of the second drop holes 136, the amount of the coolant to be supplied to the heat generating components can be increased. Since the second drop holes 136 have the throttle portions to eject the coolant toward the teeth P2 which are in mesh, of the input gear 102a, 104a, and the output 102b, 104b of the transmission 88, the gear pair 102, 104 can be lubricated effectively using a small amount of the coolant.

In accordance with the present embodiment, the driving motor 54 can be cooled effectively, and the gear pair 102, 104 can be lubricated effectively. Since there is no need for a driving source used exclusively for driving the mechanical pump 114, the mechanical pump 114 can be manufactured at a low cost.

As shown in FIG. 2, since the oil reservoir 126 is integrally provided as the "second reservoir section" at the upper portion of the case 58, it is not necessary to provide the oil reservoir 126 separately from the case 58, and the oil reservoir 126 can be manufactured at a low cost. Alternatively, the "second reservoir section" may be provided separately from the case 58. For example, the volume of the cooler 64 of the inverter unit 40 may be increased and the cooler 64 with a great volume may be used as the "second reservoir section". In this case, the bottom portion of the cooler 64 may be formed with the first drop holes and the second drop holes.

As shown in FIG. 2, the oil reservoir 126 is placed in the region between the driving motor 54 and the driving power transmission mechanism 56 as the "second reservoir section." Therefore, the region between the driving motor 54 and the driving power transmission mechanism 56 can be utilized efficiently, and an increase in the size of the case 58 due to the presence of the oil reservoir 126 does not occur.

As shown in FIG. 3, the driving power transmission mechanism 56 includes the clutch member 94. The mechanical pump 114 is configured to receive the driving power from a portion of the driving power transmission path which is downstream of the clutch member 94. Therefore, even when the clutch member 94 is disengaged, the mechanical pump 114 can continue to operate by the rotational power transmitted from the rear wheel 20 (drive wheel) to supply the oil to the oil reservoir 126.

As shown in FIG. 2, in the above-described embodiment, the oil reservoir 126 is provided with the first drop holes 134 and the second drop holes 136. However, the second drop holes 136 may be omitted. In this case, it is desirable to determine the number, bore diameter, shape, or the like of the first drop holes 134 so that the oil reservoir 126 can be filled with the oil. Specifically, when the amount of the oil naturally discharged from the oil reservoir 126 through the first drop holes 134, per unit time, is a discharge amount Q', and the amount of the oil supplied to the oil reservoir 126 through the inlet 132, per unit time, is a supply amount R', it is desirable to determine the number, bore diameter, shape or the like of the first drop holes 134 so that the discharge amount Q' is less than the supply amount R'.

Figure 6:
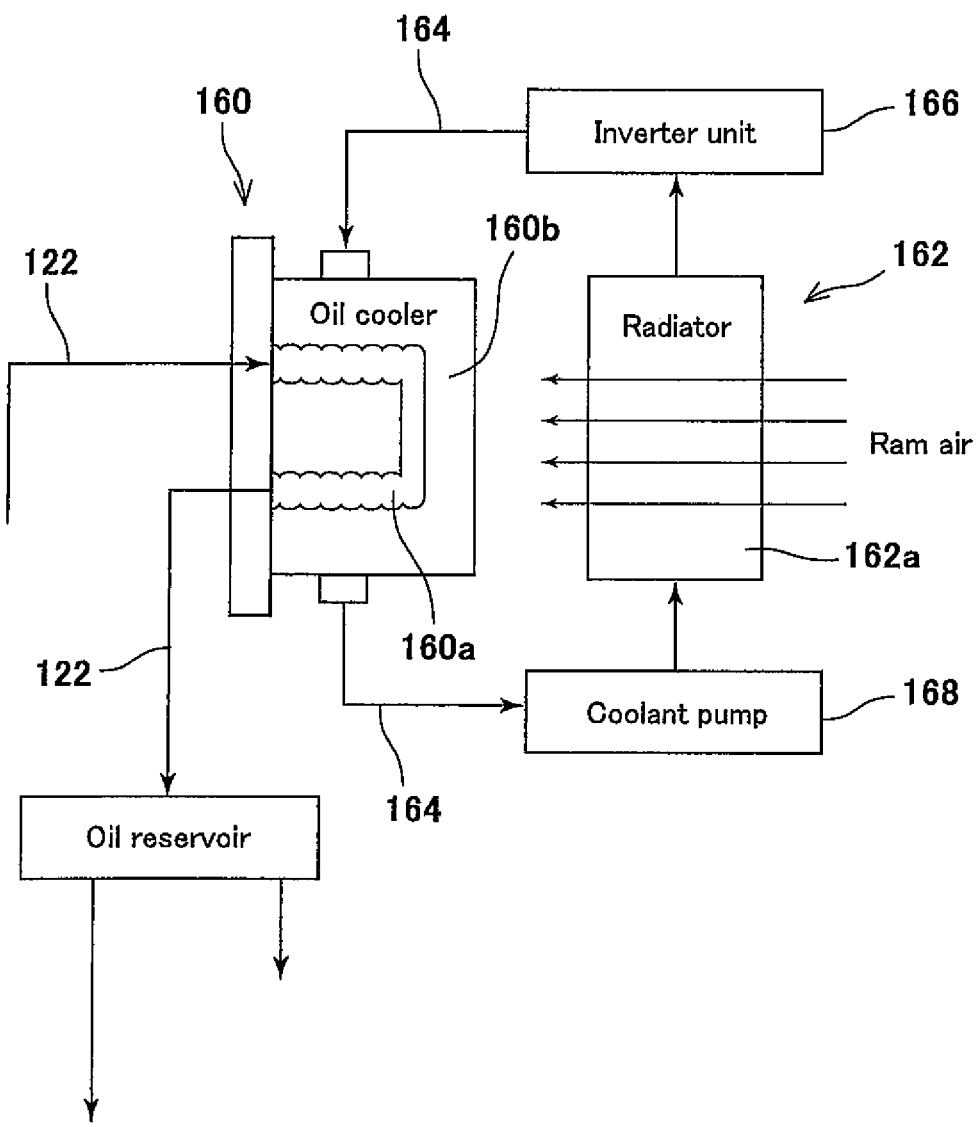
FIG. 6 is a block diagram showing an oil supply passage according to Modified Example.

FIG. 6 is a block diagram showing an oil supply passage according to Modified Example. The block diagram of FIG. 6 shows only the components changed from those of the block diagram of FIG. 5. In Modified Example of FIG. 6, an oil cooler 160 is provided instead of the oil cooler 142 of FIG. 5. A radiator 162 is placed in front of the motor unit 42 (FIG. 2). The oil cooler 160 and the radiator 162 are in communication with each other via a circulating passage 164 which circulates the coolant. The coolant flowing through the circulating passage 164 is a liquid (water or the like) with a heat conductivity which is higher than that of the oil flowing through the fluid passage 122. In the circulating passage 164, an inverter unit 166 is provided downstream of the radiator 162. In the circulating passage 164, a coolant pump 168 is provided upstream of the radiator 162.

In the radiator 162, heat exchange between the coolant flowing through the interior of a radiator core 162a and the ram air flowing along the surface of the radiator core 162a takes place. The coolant which has been cooled by the radiator 162 is supplied to the inverter unit 166, and cools the inverter (not shown). After that, the coolant is supplied to the oil cooler 160. In the oil cooler 160, heat exchange between the oil supplied from the mechanical pump 114 and the electric pump 116 (FIG. 5) to an oil passage 160a and the coolant supplied from the inverter unit 166 to a coolant passage 160b takes place. The coolant which has taken the heat out of the oil in the oil cooler 160 is suctioned by the coolant pump 168, and supplied to the radiator 162 again. In this Modified Example, the inverter unit 166 and the oil can be cooled effectively, by use of the coolant with a heat conductivity which is higher than that of the oil.

An electric pump or a mechanical pump driven by the rotational power transmitted from the driving motor 54 or the driving power transmission mechanism 56 (FIG. 4) may be used as the coolant pump 168 of FIG. 6. In a case where the mechanical pump is used as the coolant pump 168, the coolant pump 168 may be provided integrally with the mechanical pump 114 (FIG. 4). For example, the mechanical pump 114 and the coolant pump 168 may include a common rotary shaft rotated by the rotational power transmitted from the driving motor 54 or the driving power transmission mechanism 56. In this case, the coolant pump 168 can be manufactured at a lower cost than in a case where the mechanical pump 114 and the coolant pump 168 are independently manufactured.

The electric vehicle of the present invention is not limited to the electric motorcycle, and may be, for example, an all-terrain vehicle (ATV), a small truck, etc. The electric vehicle of the present invention may be an electric vehicle incorporating a fuel cell as a driving source, or a hybrid electric vehicle incorporating the driving motor 54 and the engine as the driving source.

REFERENCE CHARACTER LIST 10 electric vehicle
54 driving motor
56 driving power transmission mechanism
118 oil pan
126 oil reservoir
122 fluid passage
134 first drop hole
136 second drop hole

The invention claimed is:

1. An electric vehicle comprising:
a driving motor which generates heat during an operation of the driving motor;
a transmission which transmits driving power of the driving motor to a drive wheel and is placed radially outward and rearward relative to the driving motor;
a first reservoir section which is placed below the driving motor and reserves an oil therein, the oil cooling the driving motor and lubricating the transmission;
a second reservoir section which is placed above the driving motor and reserves the oil therein;
a fluid passage which causes the first reservoir section and the second reservoir section to be in communication with each other;
a pump which supplies the oil from the first reservoir section to the second reservoir section through the fluid passage; and
a case which includes a first accommodating space that accommodates the driving motor therein and a second accommodating space that accommodates the transmission therein and is placed rearward relative to the first accommodating space,
wherein the second reservoir section includes:
a recess that is formed at an upper portion of the case and having a reservoir space which reserves the oil therein;
a first drop hole which causes the reservoir space and the first accommodating space to be in communication with each other and through which the oil is dropped toward the driving motor by a gravitational force; and
a second drop hole which causes the reservoir space and the second accommodating space to be in communication with each other and through which the oil is dropped toward the transmission by the gravitational force,
wherein the first drop hole and the second drop hole are formed at an inclined bottom portion of the recess,
wherein the second drop hole has a bore diameter smaller than a bore diameter of the first drop hole, and an upper end of the second drop hole is set to be lower than an upper end of the first drop hole, and
wherein an axis of the second drop hole is inclined with respect to a vertical direction such that the second drop hole is directed to teeth of the transmission, the teeth being in mesh.

2. The electric vehicle according to claim 1, wherein the pump is mechanically driven by the driving motor or the transmission.

3. The electric vehicle according to claim 1, wherein the driving motor and the transmission are arranged side by side in a horizontal direction, and wherein the second reservoir section is placed between the driving motor and the transmission.

4. The electric vehicle according to claim 1, further comprising:
an inverter unit connected to the driving motor,
wherein the inverter unit is cooled by the oil flowing through the fluid passage.

5. The electric vehicle according to claim 4, wherein the inverter unit is placed above the second reservoir section.

6. The electric vehicle according to claim 1, wherein the pump includes a mechanical pump which is mechanically driven by one of the driving motor and the transmission, and an electric pump.

7. The electric vehicle according to claim 1, wherein the second reservoir section includes a lid which closes an upper opening of the recess.

8. The electric vehicle according to claim 1, further comprising:
an oil cooler which cools the oil flowing through the fluid passage,
wherein the fluid passage is configured to supply the oil to a bearing of the driving motor and a bearing of the transmission, in a location that is downstream of the pump and upstream of the oil cooler.

9. The electric vehicle according to claim 1, wherein the first drop hole and the second drop hole are set so that a discharge amount, which is an amount of the oil discharged through the first drop hole and the second drop hole per unit time, is less than a supply amount, which is an amount of the oil supplied to the second reservoir section per unit time.

10. The electric vehicle according to claim 1, wherein each of the first drop hole and the second drop hole is formed with a throttle portion.

* * * * *